United States Patent
Roberts

(10) Patent No.: US 12,472,494 B2
(45) Date of Patent: Nov. 18, 2025

(54) SELF-CONTAINED MODULAR ANALYTICAL CARTRIDGE AND PROGRAMMABLE REAGENT DELIVERY SYSTEM

(71) Applicant: Leslie Don Roberts, Fort Worth, TX (US)

(72) Inventor: Leslie Don Roberts, Fort Worth, TX (US)

( * ) Notice: Subject to any disclaimer, the term of this patent is extended or adjusted under 35 U.S.C. 154(b) by 1169 days.

(21) Appl. No.: 16/653,486

(22) Filed: Oct. 15, 2019

(65) Prior Publication Data
US 2020/0114354 A1    Apr. 16, 2020

Related U.S. Application Data

(63) Continuation of application No. 14/777,134, filed as application No. PCT/US2014/016574 on Feb. 14, 2014, now abandoned.
(Continued)

(51) Int. Cl.
*B01L 3/00* (2006.01)
*G01N 35/00* (2006.01)
*G01N 35/10* (2006.01)

(52) U.S. Cl.
CPC ......... *B01L 3/502715* (2013.01); *B01L 3/502* (2013.01); *G01N 35/0092* (2013.01);
(Continued)

(58) Field of Classification Search
CPC .............. B01L 3/502715; B01L 3/502; B01L 2200/026; B01L 2200/027;
(Continued)

(56) References Cited

U.S. PATENT DOCUMENTS

2002/0124896 A1    9/2002  O'Connor et al.
2003/0224371 A1   12/2003  Thomas et al.
(Continued)

FOREIGN PATENT DOCUMENTS

EP    1661988      5/2006
JP    200194373    7/2001
(Continued)

OTHER PUBLICATIONS

Langelier, Sean M., Eric Livak-Dahl, Anthony J. Manzo, Brian N. Johnson, Nils G. Walter, and Mark A. Burns. "Flexible casting of modular self-aligning microfluidic assembly blocks." Lab on a Chip 11, No. 9 (2011): 1679-1687.
(Continued)

*Primary Examiner* — Samuel P Siefke
(74) *Attorney, Agent, or Firm* — D. Tiller Law PLLC; Don Tiller

(57) ABSTRACT

A modular system for constructing a variety of self-contained analytical cartridges enabled to perform a number of symmetrical or asymmetrical tests on a single sample source within a single device. Said cartridges are embodied as a readily reversible assemblage of two or more modules that are, in turn, operable to perform one or more tasks of an analytical test as discrete articles-of-manufacture. A programmable reagent delivery system comprising one or more serialized reagent clusters having one or more wet cells (individually packaged reagents) and zero or more dry cells (calibrated spacers); wherein, said wet cells are arranged in a linear series corresponding to prescribed temporal release sequence and dry cells are interpositioned between wet cells in a manner that enables two or more test protocols having asymmetrical release sequences to be synchronized such that a single mechanism can actuate more than one test protocol simultaneously.

13 Claims, 17 Drawing Sheets

Related U.S. Application Data

(60) Provisional application No. 61/802,408, filed on Mar. 16, 2013.

(52) U.S. Cl.
CPC ........ *G01N 35/10* (2013.01); *B01L 2200/026* (2013.01); *B01L 2200/027* (2013.01); *B01L 2200/028* (2013.01); *B01L 2200/10* (2013.01); *B01L 2200/16* (2013.01); *B01L 2300/044* (2013.01); *B01L 2300/0672* (2013.01); *B01L 2300/0832* (2013.01); *B01L 2300/0861* (2013.01); *B01L 2300/087* (2013.01); *B01L 2400/0415* (2013.01); *B01L 2400/0481* (2013.01); *B01L 2400/0683* (2013.01); *B01L 2400/082* (2013.01); *G01N 35/00* (2013.01); *G01N 2035/00326* (2013.01); *G01N 2035/0094* (2013.01); *G01N 35/1079* (2013.01)

(58) Field of Classification Search
CPC .......... B01L 2200/028; B01L 2200/10; B01L 2200/16; B01L 2300/044; B01L 2300/0672; B01L 2300/0832; B01L 2300/0861; B01L 2300/087; B01L 2400/0415; B01L 2400/0481; B01L 2400/0683; B01L 2400/082; G01N 35/0092; G01N 35/10; G01N 35/00; G01N 35/1079; G01N 2035/00326; G01N 2035/0094

See application file for complete search history.

(56) References Cited

U.S. PATENT DOCUMENTS

| | | |
|---|---|---|
| 2006/0051248 A1 | 3/2006 | Cho et al. |
| 2006/0183216 A1 | 8/2006 | Handique et al. |
| 2007/0025876 A1 | 2/2007 | Nishijima et al. |
| 2007/0166199 A1 | 7/2007 | Zhou et al. |
| 2009/0236226 A1 | 9/2009 | Yuen |
| 2009/0302190 A1* | 12/2009 | Trieu ...................... B01L 9/527 248/682 |
| 2010/0075311 A1 | 3/2010 | Barrault et al. |
| 2010/0307616 A1 | 12/2010 | Liou et al. |

FOREIGN PATENT DOCUMENTS

| | | |
|---|---|---|
| WO | 9002938 | 3/1990 |
| WO | 9825141 | 6/1998 |
| WO | 2001014870 | 3/2001 |
| WO | 2003084629 | 10/2003 |
| WO | 2004022233 | 3/2004 |
| WO | 2007011305 | 1/2007 |
| WO | 2008037995 | 4/2008 |
| WO | 2008063227 | 5/2008 |

OTHER PUBLICATIONS

Shaikh, Kashan A., Kee Suk Ryu, Edgar D. Goluch, Jwa-Min Nam, Juewen Liu, C. Shad Thaxton, Thomas N. Chiesl et al. "A modular microfluidic architecture for integrated biochemical analysis." Proceedings of the National Academy of Sciences 102, No. 28 (2005): 9745-9750.

Yuen, Po Ki, Jody T. Bliss, Christopher C. Thompson, and Richard C. Peterson. "Multidimensional modular microfluidic system." Lab on a Chip 9, No. 22 (2009): 3303-3305.

International Search Report mailed Sep. 23, 2014 for International Application No. PCT/US2014/016574.

Written Opinion of the International Searching Authority mailed Sep. 22, 2015 for International Application No. PCT/US2014/016574.

Oct. 26, 2018 Office Action, U.S. Appl. No. 14/777,134.

Jan. 25, 2018 Office Action, U.S. Appl. No. 14/777,134.

* cited by examiner

SELF-CONTAINED MODULAR ANALYTICAL CARTRIDGE AND PROGRAMMABLE REAGENT DELIVERY SYSTEM

CROSS REFERENCE TO RELATED APPLICATIONS

This application is a continuation of U.S. Non-provisional application Ser. No. 14/777,134, which is a 371 application of International Application No. PCT/US2014/016574, filed Feb. 14, 2014, which claims priority to U.S. Provisional Patent Application 61/802,408, filed Mar. 16, 2013, all of which are incorporated by reference in its entirety herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

Field of the Invention

The field of the current invention relates to self-contained single-use fluidically-operated analytical devices considered to be portable and operable to perform one or more analytical test requiring a liquid or semi-solid environment. Applications related to the present invention are realized fields employing analytical testing such as environmental testing, food safety, national defense, research tools, drug development, and medical diagnostics.

Description of Related Art

A microfluidic device is a solid-state mixing device enabled by a fixed-configuration continuous-flow fluid control network physically disposed within an appropriate substrate. This fluid control network enables the mixing of small volumes of analytical material in a controlled manner without external user assistance and by doing so possesses the potential to enable the automation of many complex analytical procedures. A broad spectrum of microfluidic devices exist ranging from simple mixing manifolds to fully integrated self-contained analytical systems. Each type of device varies in the degree of its self-containment, the quantity and types of test it can perform, its fluid management, and its method of manufacture. The subject of the present invention pertains most closely to fully integrated analytical systems embodied as portable self-contained fluidically controlled cartridges operable to facilitate one or more quantitative or qualitative analytical tests within a liquid or semi-solid environment.

To meet the requirements of portability and self-containment these devices must be easily transportable and operable in the field at the point of sample collection. These devices must also be enabled to store, dispense, and facilitate the controlled mixing of one or more analytical materials without external assistance and retain the collective volumes of spent solutions used during the course of the analytical test. Such devices are generally manufactured as singularly-indivisible holistically self-contained articles of manufacture fabricated by advanced lithography techniques or laminating progressive stencil layers to form the requisite fluid control structures of a fluid control network. These structures are then loaded with the requisite analytical materials needed to carry out a test, and then the device is sealed to form a closed system. With a few exceptions this is a contiguous manufacturing process that generates a device having inseparable constituent parts. Such devices are generally operated by establishing a pressure gradient force within the device that induces the movement of fluid through the device from regions of elevated pressure to regions of lower pressure. An operable pressure gradient force can be generated directly by pneumatic, hydraulic, or peristaltic pumps which add a gas or immiscible liquid to one or more inlets while subtracting a proportional amount from an outlet or, by the elevation in pressure generated by releasing materials from blister packaging integrated into the fluid control network. Such a force can also be generated by indirect means through the use of plunger systems, squeeze blubs, and centrifuges; and, it is also possible to exploit the electrochemomotive properties of charged molecules within an electrical field. These devices generally control the mixing of fluids by simultaneously releasing multiple fluids along individually calibrated paths that vary in length and diameter; and/or, by releasing each fluid in a temporal sequence by selectively establishing an operable motive force at one or more fluid reservoirs strategically positioned about the device. Briefly, different analytical reagents exhibit different flow and mixing rates and weak forces such as capillary action and surface tension, generally overlooked in large volumes, become dominate forces in the fluid dynamics of small volumes. Likewise, different tests require different types and volumes of reagents administered in differing temporal sequences. The act of designing an operable fluid control network to store, mix, and retain the collective volumes of materials in a temporally controlled manner typically renders a highly specialized device specific for a given test; meaning, a new device is required for each test or combination of tests.

How a device configures its fluid control pathways and the mode of operation it employs determines the number and types of test it can perform. Devices configured to perform more than one test can be classified either as a homogenous or heterogeneous testing platforms; and, the difference between, and within, these two classes can lead to some confusion depending on whether "a test" is referred to by its sample source, the variable it is measuring or, both. For purposes of clarity, "a test", "multiple tests", or "one or more test" as may be used herein, is intended to be interchangeable with "one or more of a type of test". A homogenous testing platform can perform multiple tests in at least one of two ways; it can hold the test protocol constant and vary the sample being tested or it can hold the sample constant and vary a type of reagent used in the test protocol without altering its volume or sequence of administration. In the first example a number of sample sources are tested for the same compound and, in the second example a single sample source is tested for multiple compounds. Regardless how you define "a test", in both examples, the volumes and temporal sequence of administering each fluid is held constant which allows one fluid control network to be calibrated for the type of test and then symmetrical replicated for the number of tests desired which enables all test to be actuated simultaneously in a uniform fashion. Due to the symmetry of the system, the means (ports, electrodes, plungers, etc) that actuate the motive force to move these fluids can be placed predictably about various iterations of the device while also conserving the overall dimension of the device. This in turn, enables multiple devices to be operated by a common analytical instrument and, doing so, has a high commercial value. The term "analytical instrument", as used herein, is intended to generically refer to a second instrument specially enabled to operate and analyze data acquired from the device. Heterogeneous testing platforms, on the other hand, integrate different types of tests involving different types, volumes, and temporal release sequence of reagents. While these testing platforms derive greater commercial value from the diversity of test they can perform on a single sample source, due to their asymmetry they are easily orders of magnitudes more difficult to design and operate compared to homogenous testing platforms. While some simultaneously actuated heterogeneous testing platforms exist, their commercial utility is generally limited to a small number of tests. Heterogeneous testing platforms that perform a commercially relevant number of tests generally require differentially configured fluid control networks actuated independently of each other. This generally precludes the predictable placement of means (ports, electrodes, plungers, etc.) to actuate the motive force needed to move fluids within the system. This in turn, leads to the need for different analytical instruments or the use of complex adaptors to operate these systems, neither of which is commercially favorable.

In addition to being difficult to design and operate, being singularly-indivisible and holistically self-contained, most of these devices have poor fault tolerances and are difficult to manufacture. For example, the shelf-life of a device possessing numerous analytical reagents would be defined by those reagents with the shortest life expectancy. From a production standpoint, it would be favorable to maximize the operational life-expectancy of each device by strategically pairing the tests on any single device to ones with compatible shelf-lives and storage conditions. Doing so diversifies the number of devices needed to perform the equivalent number of tests which limits the full utility of such a device. As a device that is inseparable into constituent parts the individual elements of the device cannot be individually fault-tested which, when coupled to a contiguous manufacturing process, results in an incrementing risk profile as the device is assembled which increases the cost of sacrificing the entire device if any single element fails to conform to specification. Likewise, without the ability to interchange defective components, entire production lots are placed at risk when an analytical reagent, sensor, or other material reaches its life-expectancy or, is found to expire prematurely or malfunction post-manufacture.

As previously mentioned, it is commercially favorable to perform as many types of tests as possible from a single sample source and employ different iterations of devices to diversify the testing capability of the system employing a common analytical instrument. In order to do so, each device iteration must have both a conserved mechanism-of-operation and overall dimension so as to operably interface with a common analytical instrument. This means that, depending on the circumstances of the tests, the fluid control network must be scaled up or down to accommodate the total reaction volumes of the aggregate number of tests being performed and as more tests are integrated into the system the total reactant volumes per test must be scaled-down in order to free-up physical space. While the physical layout of the fluid control network is largely a design issue that is self-limiting; the total reactant volume of a test, the sample volume in-particular, can only be decrease so much before it ceases to meaningfully represent the larger system. Therefore, in circumstances where low abundance targets are present in dilute environments, as is the case in most bioanalytics, an adequate sample size must be tested meaning. Thus, fluid control systems must be scaled-up to handle larger reactant volumes which limits the total number of tests the device can perform. This again, is commercially unfavorable. It would therefore be commercially favorable to reduce the physical foot-print by simplifying the fluid control network needed to perform a given tests.

While not an exhaustive list, a commercially viable microfluidic cartridge design should be able to perform multiple types of tests on an adequate sample size with precision, sensitivity and reproducibility. The fluid control network should be simplified and standardized in order to be adaptable to new test and test combinations without significant retooling. The mode of operation and overall device dimension should be such that enables multiple devices to be operated by a single analytical instrument, and the device should be easy to manufacture at commercial scales and provide improved fault testing and fault tolerances.

SUMMARY OF THE INVENTION

The subject of the present invention pertains to the use of a modular system to create a plurality of possible analytical cartridges, a method to create a modular analytical cartridge derived from a common continuous-flow fluid control network, a plurality of possible module types that can be rendered operable to perform one or more steps of an analytical task, a plurality of possible modular assemblages operable to perform an analytical task as a self-contained device, the use of individually packaged reagents in an analytical cartridge, the use of a serialized reagent cluster in an analytical cartridge, a method of programming the release sequence of a dispensable material to an analytical task, and a method to temporally synchronize the release sequences of a variety of dispensable materials to two or more analytical tasks.

Certain aspects of the present invention pertain to various aspects of a fluidically controlled system. Within the context of the present disclosure the terms "fluid control network", "fluid control structure", and "fluid control pathway" are used as follows: "Fluid control pathways" refer to structures that define a path enabling the transfer of a fluid material between two structures; "fluid control structure" pertains to various structural elements that comprise a fluid control network; such as, reservoirs, analytical chambers, etc.; "fluid control network" refers to the fluid control system in aggregate comprising and referring to among other things the physical disposition of various fluid control pathways and fluid control structures and may enable the controlled mixing of analytical materials. Similarly, the term "mode-of-operation", "mechanism-of-operation", and "method-of-operation" are used as follows: "mode-of-operation" references the type of gradient force employed within various modules or modular assemblages; for example by, centrifugational force, pressure-gradient force, or electrochemotive force, etc.; "mechanism-of-operation" references the means used to establish a gradient force; for example, linear actuators, centrifuges, pneumatic or peristaltic pumps, or the flow of a electrical current, etc.; and, "method-of-operation" references how the cartridge is operated and generally refers to an automated, a manual, or a combination of an automated and manual process that may be facilitated by a computer assisted device programmed or mechanical configured to automate a predetermined stepwise process, and/or the use of a human hand that may grasp and otherwise operate a device.

It is realized that many articles can be employed to interconnect different types of modules, control the movement of fluids, and perform various tasks essential to the operation of a cartridge as the circumstances of a specific test dictate. Such articles may be unambiguous configurations of cooperative mechanical attachment, cooperating slide and slide guides, clips, appliques or other means capable of directing the assembly of specific modules into specific cartridge types; means to receive, store and/or make available fluids by means of cavities, bladders, and/or prepackaged reagent cells; means enabling fluid transfer within and between modules in the form of tubes or channels or other geometric configurations that facilitate the transfer and possibly separation of fluids; means to improve the interrelationship and transfer of fluids between the cooperating fluid transfer pathways of interconnected modules, such as mechanical seals, gaskets, sterile seal barriers, or self healing stoppers; means to improve fluid control, such as switches, tubes, valves, choke points, diverters, piercing devices, shunts, ports, vents, gaskets, compression forms, and/or magnetized or magnetic material; mechanical or chemical means intended to prepare a sample for analysis, such as analytical reagents, membranes, sieves, filters, or features that enable a module to undergo centrifugation; means to assist in the acquisition of data pertaining to an analytical procedure, such as electrical, chemical, and/or light: sensors, meters, filters, photomultipliers, polarizers, or light blocking, reflective, or transparent materials, structures, or appliques; means that further enable the operation of the device by means of an electrical current generated within or about a module or module assembly, such as electrical circuits, electrically conductive material, or electricity storage devices, such as batteries or capacitors; and, means that allow module to move relative to other modules as set forth by guide paths within or about other modules, such as plungers, select module configurations, linear actuators, slides or other types motion directing or imparting devices.

One aspect of the present invention provides for a modular system enabled to create a wide variety of analytical cartridges operable to perform one or more analytical test in a liquid or semi-solid environment. Various aspects of this modular system enables a conserved overall dimension and mechanism-of-operation for a number of possible modular assemblages in their final assembled state. This enables a common analytical instrument to operate multiple types of cartridges derived from said system. Other aspects of the modular system provide for functional groupings of fluid control structures to be manufactured as discrete modules enabled to be rendered operable to perform one or more steps of an analytical process as a functionally self-contained unit. This provides for a segmented manufacturing process that can uncouple the production cost of modules requiring specialized facilities, such as clean rooms, from less specialized modules while also improving the scalability of manufacturing various modules at a commercially meaningful scales of production. Other aspects of this system provides for the fault-testing of individual modules independently of the final assembled device form while also providing for improved fault-tolerances of the final assembled device. For example, if a module fails to meet operational specifications at any point prior to the initialization of a test, the module can be readily disconnected from the device and replaced with a functioning module without undue hardship or the need to sacrifice the entire device. Still other aspects of this modular system enable a unique mechanism-of-operation. In certain modular assemblages a module may be positioned internally to another module and made to move relative to that module. While many types of cartridges enabled by this system employ pneumatically driven pressure gradients to induce the movement of fluid within and between modules, certain embodiments that possess this type of modular configuration may also employ mechanical force to leverage the compressive force imparted by the movement of two objects inwardly relative to each other in order to operate additional aspects provided for by the present system. Other aspects of the present modular system provide for means that direct an unambiguous assembly pattern of a number of cooperating modules derived from a common fluid control network into a specific modular assemblage that may also enable the operation of the final assembled device. This may be favorable when employing a modular system that presents a possibility of misassembling a device at one or more locations. Such means may include the specific disposition and interrelation of one or more physical elements of cooperative mechanical attachment between cooperating modules, and/or appliques, or other visual elements that provide visual indications of proper modular assemblages that may further possess information as to the type of analytical device and its specific operational parameters. Such means may also be divisions of electrical circuits disposed about cooperating modules enabled to close a circuit when properly assembled that may further enable the communication of information pertaining to the operation of a cartridge to an analytical instrument designed to operate the cartridge. Other aspects of the present system are found in the ability to vary the physical dimensions and configurations between of individual modules to meet the requirements of a specific analytical task while conforming to a standard overall dimension and mechanism-of-operation of the finished device form. This provides high adaptability of the present modular system in performing a wide-variety of analytical tasks while relying on a common analytical instrument.

Another aspect of the present invention provides for a method for creating a modular analytical device operable to perform an analytical test as a closed system. The method describes the steps of selecting of one or more analytical tests to be performed on a sample; designing a continuous-flow fluid control network operable to perform the select analytical tests accounting for, among other things, the requisite fluid control structures operably interconnected by fluid control pathways; dividing the fluid control network into function groupings that are favorable to manufacture as a number of discrete articles of manufacture that possess sufficient cooperative modularity to be reassembled and reconstruct the original fluid control network. The selection of fluid control structures to be included within a functional division may vary depending on the circumstances of each test but it is realized that creating functional division of fluid control structures having a similar function may be favorable from a manufacturing and operational standpoint. For example, a functional division possessing only analytical chambers may be favorable as a distinct article of manufacture if said chambers are made to hold an analytical reagent that must be kept sterile. In this example, a single module could be rendered operable in a sterile environment, sealed and transported to a separate facility where it could be joined with additional modules having other elements needed to perform the analytical test. However, it is realized that different combinations of fluid control structures may be collocated within a single module as is favorable for specific circumstances, such as the inclusion of a waste reservoir in the previously mentioned module embodiment.

Another aspect of the present invention provides for a number of possible modules that may also be rendered operable to perform one or more steps of an analytical test by the inclusion of requisite analytical material needed to perform said tests. The following selection of possible embodiments is provided to illustrate a variety of aspects of a number of possible module embodiments manifested in a variety of operational contexts. The inclusion or exclusion of possible embodiments is not intended to be limiting in any way but rather provided so as to communicate the broader context of various aspects of select module embodiments. One aspect of these modules may be the inclusion of one or more fluid control structures that has been functionally reduced and individualized from a common fluid control network enabled to perform one or more analytical tasks. The use of the term "functionally reduced" is intended to communicate the consolidation of one or more fluid control structures, their corresponding fluid control pathways, and any other requisite equipment or materials into consolidated functional division of a select fluid control network. Similarly the term "individualized" is intended to communicate that an operable functional division is physically separated from the fluid control network and disposed in an undivided operable state within the context of an individual module. For example, such a fluid control structure may be a type of reservoir enabled to store, dispense, and/or retain an analytical reagent, a sample, or the waste solutions spent during the course of an analytical test. Another example may be a mixing chamber and/or an analytical chamber made to mix various materials in a controlled fashion or serve as a site that enables the collection of information pertaining to the test being performed. Another aspect of a module may possess a functional structure, embodied as a substantially solid structure, a compartment, or a slot made to house module subassemblies that may embody other fluid control structures, electrical storage devices, sensors, or simply serve to conserve the overall dimension and/or mode of operation of the device. Other examples may include multi-use structures that consolidate two or more functions into a single structure such as a dual mixing/sample reservoir. Many types and configurations of fluid control structures are realized and the inclusion of such structures depends on the circumstances of the test being performed. Each module may also include equipment that enables different types of analytical tasks, such as a flow aperture enabled to perform flow cytometry, electrodes to establish an electrical current enabling electrophoretic separation of electrically charged materials, or ports that enable the addition or subtraction of a gas or liquid from various modules enabling a pressure gradient to be established within and between modules. Other aspects of modules may include mechanical means that may be used to direct a specific assembly pattern between two or more modules that may also function to enable the operation of a module assemblage. Other aspects of these modules may possess one or more elements of cooperative mechanical attachment disposed about the module in coordination with a one or more select cooperating modules. For example, an element of a cooperative mechanical attachment may be the tooth of a tooth and groove clip; wherein, the tooth is positioned on one module and the groove on a cooperating module and the positioning of both components is selective for each module. Another example may be a slide/slide guide assembly; wherein a slide is present on one module and the slide-guide on a cooperating module and the geometric configuration of the assembly, such as a box-slide, barrel-slide, or triangle-slide, is selective for a cooperating module. In certain embodiments of these modules one or more fluid control pathways are disposed to open to one or more sides of the module. These opening may be inlets and/or outlets depending on the type of modular embodiment. Another aspect of these fluid control pathways is that the physical disposition of these inlets or outlets must coordinate and cooperate with fluid control pathways of cooperating modules. Likewise, certain embodiments of these modules must possess the ability to be sealed in order to contain materials within the fluid control structures resident within the module. An aspect of this seal is that it must be reversible in order to allow fluid communication between modules. There are many ways to achieve this. For example, a first module could be made to possess a piercing device operatively recessed within a fluid control pathway thereby allowing an adhesive barrier placed over its opening and a second cooperating module could then be made to possess a protrusion having an operable diameter and extending from the second module that could also be sealed by an adhesive barrier. When the two modules are assembled in a preoperational configuration the two pathway would be operably opposed but not interconnected and when actuated to perform an analytical task the protrusion from the second module could be made to pierce the adhesive barrier of the first module while adhesive barrier of the second module would be pierced by the piercing device recessed within the fluid control pathway of the first module. Alternatively, a first module could be made to possess a self-healing stopper and a second module an exposed piercing device. In this configuration the two modules could be actuated in a manner that inserts and removes the piercing device one or more times depending on the operational parameters of the test being performed. Again, these are just a few possible means to establish fluid communication between one or more sealed modules and provide context for an operational aspect that may be necessarily required for the operation of certain embodiments of the present invention.

The present invention also provides for the use of individually prepackaged reagents in an analytical cartridge. In this aspect of the present invention select volumes of analytical reagents are embodied as individual articles of manufacture, referred to as "wet cells". Wet cells differ from blister packaging and preloaded reagents in that they are physically separable from the device, not integrated into the fluid control network and, have an internal volume that is defined by their packaging not the fill volume of a fixed reservoir in which they would otherwise be placed. They are self-contained individual articles of manufacture that may be made by means to interconnect into reagent clusters. Such means may include snaps, threaded connectors, adhesives, or simply grouped together. There are many advantages and utilities of employing individually prepackaged reagents. Select volumes of reagents can be manufactured in bulk and incorporated into an analytical device at later times and locations and since they are individually packaged they eliminate complex fluid containment strategies needed to prevent diffusion in resting fluids and allow reagents to be co-localized within different modules of various modular assemblages while providing for a simplified reagent release mechanism. They reduce waste, can be readily interchanged if they malfunction or reach the term of their life-expectancy, and can be specially packaged to extend the shelf-life of select reagents; such as, light impenetrable materials to encapsulate photosensitive reagents. Additional aspects of these wet cells provide that single-use or multi-use volumes of analytical material may be contained within a wet cell as the circumstances of a test may dictate.

Another aspect of the present invention provides for programmable reagent delivery system physically embodied as a serialized reagent cluster. An aspect of this serialized reagent cluster translates the operational protocol of an analytical test into a prescribed physical arrangement of wet cells that contain a dispensable material needed to perform an analytical test. Said wet cells are arranged in linear series corresponding to the first, second, third, etc., reagent employed by an analytical test. This serial arrangement provides for the linear insertion of a cannula sequentially into each cell of said series in a temporally controlled manner allowing the contents of each cell to be dispensed through said cannula. Other aspects of this serialized reagent cluster provide for exploiting a mechanism-of-operation provided for by other aspects of the present invention; such as the generation of a compressive force provided for by the movement of two modules relative to each other as previously described, modules that may be made to possess slots to house other modular sub-assemblies, or the use of such a system in a syringe-like analytical system having a dual function plunger system which will be discussed later on.

Another aspect of the present invention pertains to a compression form. Depending on the mechanism-of-operation for actuating the present system, certain embodiments may require the use of a compression form. A compression form is a structure made to possess openings enabled to receive and operably orient a serialized reagent cluster relative to a cannula in the formation of a reagent assemblage. The function of a compression form is to provide a space in which the cells of a reagent cluster may be compressed by the application of a compressive force to an end of the reagent cluster operable to compress each cell in said series. Certain embodiments of this compression form may be manufactured from a rigid material that resist deformation of the walls of said opening when acted on by the compression of a serialized reagent cluster by the compressive force. Other embodiments of the compression form may be manufactured from a material possessing qualities of operable compression and resilience that is also operable to resist the deformation of one or more serialized reagent clusters as both the compression form and serialized reagent cluster are compressed by a compressive force. Such a compression form may also possess operable absorptive qualities to absorb spillage of dispensable materials within the apparatus. Also, certain embodiments of this reagent assemblage may directly possess and position a cannula while in other embodiments it may be more favorable to locate the cannula elsewhere about the device. Another aspect of a serialized reagent cluster provides for the ability to communicate multiple fluids along a single fluid communication pathway which dramatically simplifies the fluid control network of devices enabled by the present invention, which in turn frees up more space for more tests.

Another aspect of the present invention provides for a method for programming the operational protocol of one or more analytical tests through the use of serialized reagent cluster possessing both wet cells and dry cells. Dry cells, which lack a dispensable content, function to provide for incubation cycles by creating a physical separation between wet cells; the greater the separation, provided by the internal volume of the dry cell, the longer the incubation period. By allowing for incubation cycles between treatment cycles, dry cells allow multiple serialized reagent clusters to be temporally synchronized enabling multiple analytical tests to be performed in parallel. This could be achieved by actuating reagent clusters individually or collectively and in a manner that is incremental or continuous. The use of this methodology and apparatus allows one or more analytical tests to be configured in a way that is largely independent of the physical configuration of a fluid control network. This provides a highly degree of adaptability to performing different types of tests involving equivalent operational protocols, or highly diverse operational protocols that differ in the types, volumes, and timing of administration of various analytical reagents.

Another aspect of the present invention provides for a number of possible modular assemblages that may be also be rendered operable to perform one or more analytical tests within the context of a single device by the inclusion of requisite analytical material needed to perform said tests. The following selections of possible embodiments have been provided to illustrate the present invention in a variety of context. The inclusion or exclusion of possible embodiments is not intended to be limiting in any way but rather serve to communicate the broader context of the present invention. A number of possible modular assemblages are realized and enabled to perform one or more analytical tests as a self-contained system in either a liquid, semi-solid, suspended-solid, or combination thereof; said systems may be a modular assemblage of two or more modules possessing a closed continuous-flow systems operable to perform one or more analytical tests, syringe based systems, electrophoresis systems, cell culture systems, and others.

Many applications for the present invention are realized and encompass technical fields that employ fluid based analytics or analytics in semi-solid or suspended-solids environments. The embodiments provided herein are intended to illustrate the general utility of the present invention in a few select contexts and is not intended as an exhaustive list of each possible module configuration, cartridge embodiment, or all possible utilities of the present invention. The number and type of functional elements described herein are not intended to be limiting as it may be preferable to include different numbers and types of functional structures as specific analytical procedures dictate and not all functional structures, variations, or possible configurations are described herein.

DETAILED DESCRIPTION

Figure 1A:
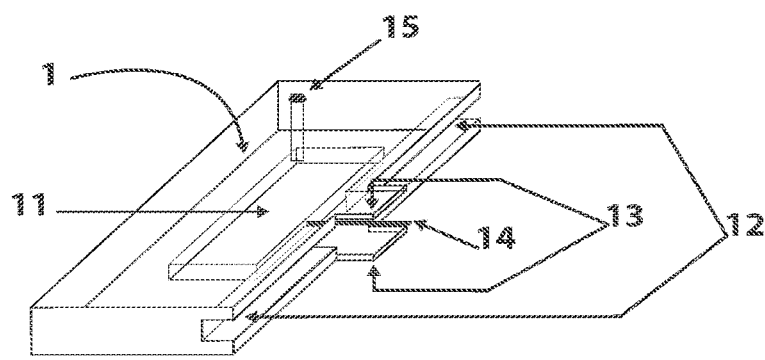
FIG. 1A: Illustrates a possible module comprising: module 1, reservoir 11, boxed slide guides 12, flange 13, a cannula 14 and pneumatic port 15.
Figure 1B:
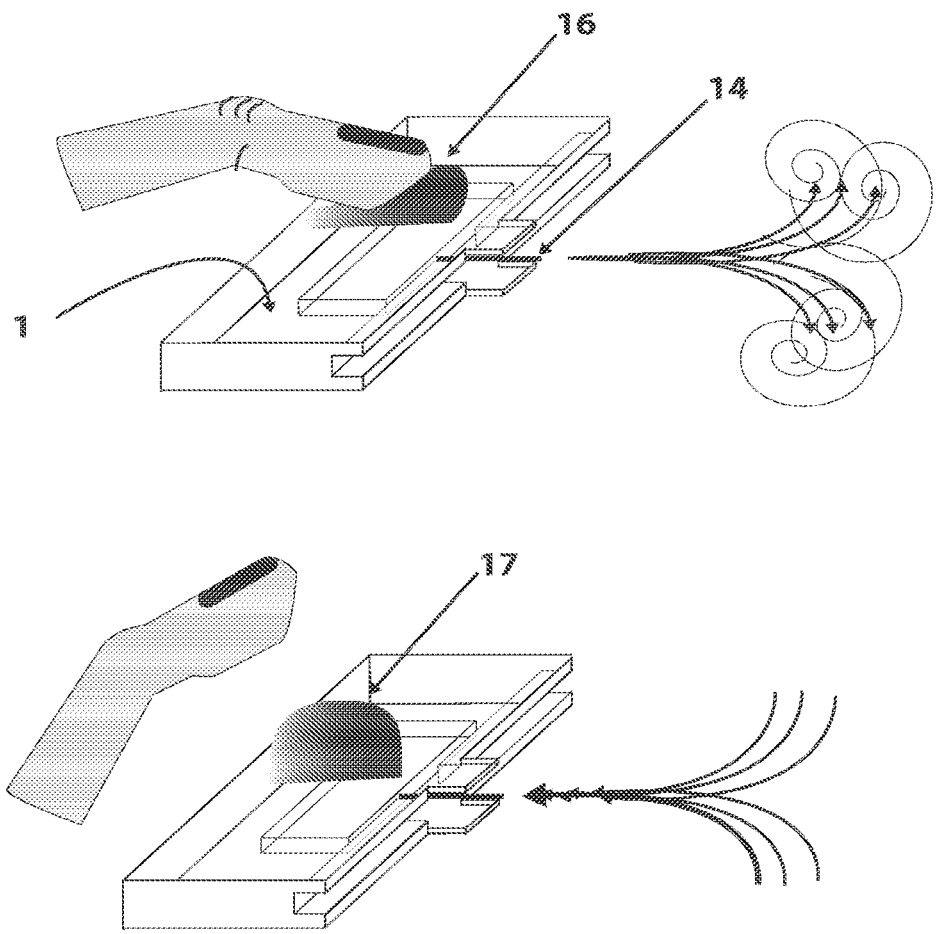
FIG. 1B: Illustrates an alternative embodiment of the module described in FIG. 1A comprising: module 1, cannula 14, and bulb assembly in its depressed state 16 and relaxed state 17.

FIG. 1A Illustrates the various functional elements that might be present on a first module 1 said module comprising a sample tube 14, a port 15 and, a cavity 11 enclosed within the substrate of the module and two independent pairs of reversible mechanical attachments 12 and 13 enabled to receive mechanical attachments from two cooperating modules. Referring to the cavity 11, said cavity could be used to store a volume of fluid material; such as, used or unused analytical reagents or a sample. Said fluid material could be stored in this cavity by placing the supply tube 14 in fluid communication with a source of material and then subtracting a gas or other material from the cavity by way of the port 15. This would establish a pressure gradient spanning the cavity resulting in the fluid material being drawn into the cavity. However, other options are available and may be more preferable for a specific analytical test. For example, said cavity could be set under a vacuum (not shown) by extracting all contents of the cavity and then sealing said cavity with a pierceable barrier. Then by means of interfacing said supply tube with a material source on one end and puncturing said seal with the other end induce fluid material to flow into said cavity as the internal pressure of the chamber moves toward equilibrium. Alternatively, FIG. 1B illustrates yet another method-of-operation to establish a pressure gradient across this cavity involving a squeeze bulb 16 operably interfaced with said cavity of the module 1. The contents of the cavity could be evacuated by manually compressing the squeeze bulb 16 then the sample tube 14 could be interfaced with a material source and then by releasing the squeeze bulb fluid material would be drawn into the cavity as the squeeze bulb restored itself to its original state 17. There are numerous methods for establishing a pressure gradient across said cavity in order to fill said cavity without departing from the context of the present invention. The methods listed herein are a few examples selected for illustrative purpose only. Some mechanical features that might be present on a module are various embodiments of reversible mechanical attachment such as the pair of slide-guides 12 for receiving a slide (not shown) from a cooperating module on either side and the protruding flange 13 that could be adapted to fit into a groove of a cooperating module or could be made to possess an element of a clip such as a tooth that could interface with a groove on a cooperative module. This is an example of how a single module could be adapted to receive three additional modules to create an assemblage of four modules. It is understood that analytical cartridges containing 2 or more modules may be preferable for different analytical task and still be consummate within the context of the present invention.

Figure 2:
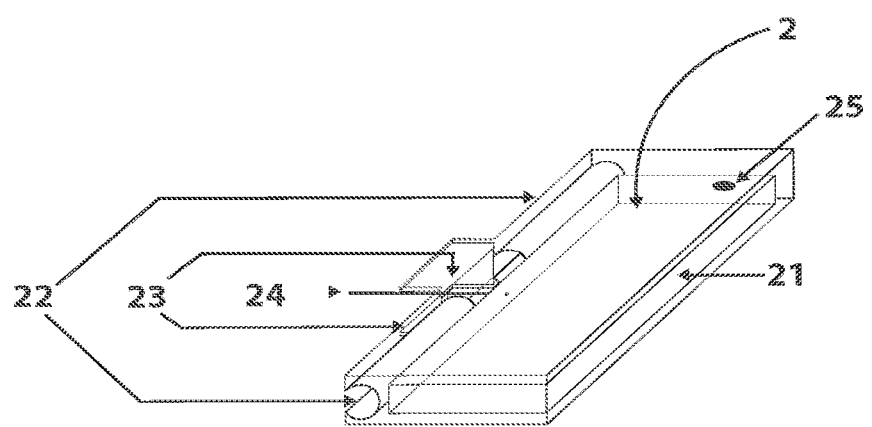
FIG. 2: Illustrates a possible module comprising: module 2, reservoir 21, cylindrical slide-guides 22, flange 23, cannula 24, and pneumatic port 25.

FIG. 2 Illustrates the various functional elements that might be present on a second module 2 said module comprising a sample tube 24, a port 25 and, a cavity 21 enclosed within the substrate of the module and two independent pairs of reversible mechanical attachments 12 and 23 enabled to receive mechanical attachments from two cooperating modules.

Figure 3:
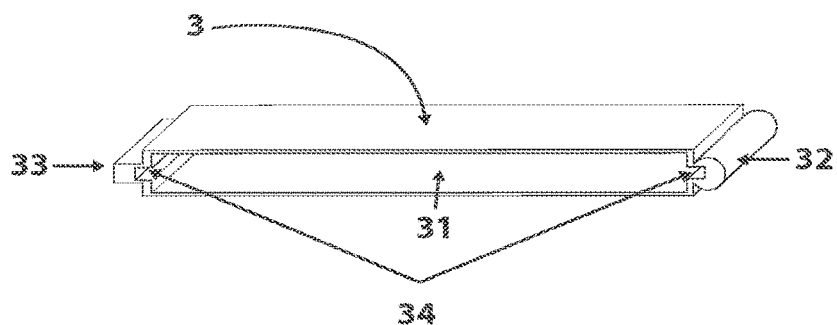
FIG. 3: Illustrates a possible module comprising: module 3, open slot 31, cylindrical slide 32, box slide 33, and boxed slide-guide(s) 34.

FIG. 3 Illustrates the various functional elements that might be present on a third module 3. Said module comprising a slot 31 a first pair of reversible mechanical attachments 34 embodied as a pair of slide-guides set internal to the module for receiving a cooperating module within the slot and a second set of reversible mechanical attachments embodied as geometrically distinct slides 32 and 33 providing for the unambiguous attachment of a different cooperating module on each slide.

Figure 4:
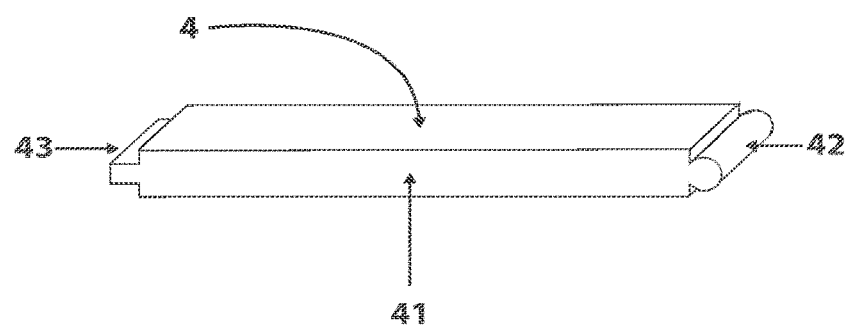
FIG. 4: Illustrates a possible module comprising: module 4, closed structure 41, cylindrical slide 42, and box slide 43.

FIG. 4 Illustrates the various functional elements that might be present on a fourth module 4. Said module may be devoid of functional structures pertaining to a fluid control network and rather provide a specific geometry needed to convey a specific overall dimension to the final assembled form of the device. Such a module could also be used to house a battery, capacitor, resistors or other electrical device (not shown) intended to store, provide, or condition energy to the analytical cartridge.

Figure 5:
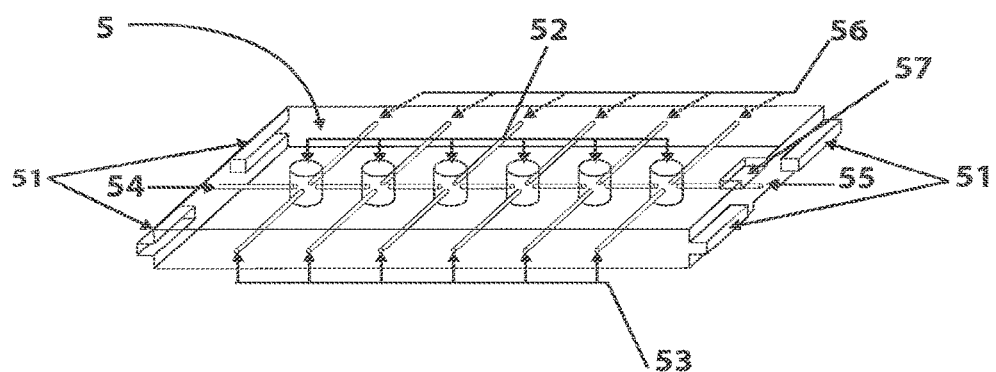
FIG. 5: Illustrates a possible module comprising: module 5, boxed slide(s) 51, mixing chambers 52, inlet(s) 53 and 54, outlet(s) 55 and 56, and a point of mechanical attachment 57 that could be present symmetrically on the opposing side of the module but not shown for visual clarity.

FIG. 5 Illustrates the various functional elements that might be present in a fifth module 5. Said module possessing a fluid control network comprising a series of inlets 53 and 54 and outlets 55 and 56 arranged about the perimeter of the module, a series of mixing chambers 52, an element of reversible mechanical attachment in the form of a groove 57 to connect a cooperating module at one end, in addition to four sets of slides 51 for providing a reversible connection to cooperating modules along each side. Additional elements to receive additional modules could be present about said module but are not included for purposes of visual clarity of the illustration. Likewise, the configuration of the fluid control network is for illustrative purposes only. A multitude of possible configurations could be employed depending on the quantity and type(s) of analytical procedures intended to be performed. An operational aspect of the fluid control network presently depicted are plural paths of fluid communication through mixing chambers 52. The primary path originates at inlet 54, passes through each of the mixing chambers, and terminates at outlet 55. The secondary path(s) originate at individual inlets 53, pass through an individual mixing chamber, and terminate at individual outlets 56. In the present configuration, a sample could be drawn through the first path into each of the mixing chambers while the plurality of secondary paths could be used to introduce a number of analytical reagents to the mixing chamber.

Figure 6:
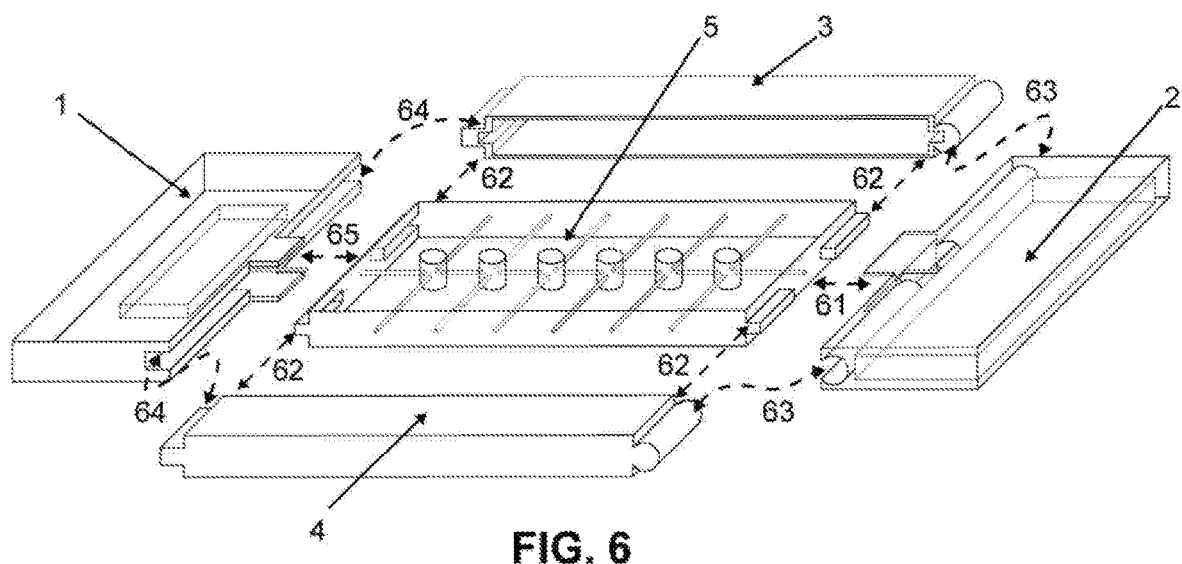
FIG. 6: Is an exploded perspective illustrating the assembly pattern of those modules illustrated in FIG. 1-5 comprising: a first attachment between module(s) 2 and 5 by route of path 61 forming assemblage 2:5, a second and third attachment between assemblage 2:5 and modules 3 and 4 by route of path(s) 62 and 63 forming assemblage 2:5:3:4, a fourth attachment between assemblage 2:5:3:4 and module 1 forming the final assemblage 2:5:3:4:1. Note that the various slide-guides provide compounding specificity to the assembly of additional modules into an 350 operable final form. For example, the interconnection of module 5 with modules 3 and 4 would preclude module 2 from the assemblage. This is due to the cylindrical nature of the slide guides present on module 3 and 4 which require said modules to be inserted into the slide guides present on module 2 in a specific manner.

FIG. 6 Illustrates how a cartridge possessing five modules might be assembled. This figure illustrates the first module 1, second module 2, third module 3, fourth module 4, and fifth module 5 as previously set forth further interrelated by dotted lines 62-64 representing how each module could be assembled by means of the various reversible mechanical attachments as previously set forth. The order of assembly depicted in the present example is unambiguous in that a first connect between module(s) 5 and 2 along path 61 must be established to allow the connection of module(s) 3 to 5, and module(s) 4 to 5 along paths 62 thereby creating a three module assembly. Doing so presents the path(s) 64 and 65 for module 1 to connected to module assemblage 2, 3, 4, and 5. This particular embodiment was selected as an example to convey how a multiple module assemblage could be bestowed with physical elements that direct the assembly of specific modules into a specific assemblage. This would be preferable for an array of analytical devices composed of modules having similar physical configuration but possessing different analytical tests that might be improperly assembled without these selective means. Among other structural elements of interest in this illustration is the manner in which the fluid control pathways are preferably configured to terminate about the perimeter of the module forming an open system enabled to interface with the fluid control pathways of cooperating modules. Additionally, the straight lined fluid control pathways 53 and 56 as depicted could be favorable in allowing direct access to the mixing chambers 52 which could enable a smaller diameter device to be inserted through said pathways and provide a means to automate the introduction of analytical reagents into the module prior to cartridge assembly.

FIG. 7 is a four part illustration A, B, C, and D illustrating the assembly and operation of a possible five module cartridge assemblage receptive to both pneumatic and mechanical mechanism-of-operation emphasizing the utility of various slide/slide-guide as previously set forth in FIG. 1-6. The utility of a diagnostic cartridge having a generally conserved overall dimension and mechanism-of-operation is advantageous in consolidating the operation of a plurality of possible cartridge configurations to a single analytical device type. Accordingly, a device possessing similar numbers and forms of modules may promote ambiguity in selecting the correct modules for a final target assemblage. The present illustration depicts the use of a variety of mechanical attachments in a manner that is both cooperative and selective to promote an unambiguous assembly pattern for specific modules. The utility of this assembly schema is for illustrative purposes only. Alternative configurations exist that can achieve an equivalent result, and the use of ambiguous elements of mechanical assembly across cartridge types may be favorable in some situations. Likewise, the weighted reliance on a five module assemblage was selected to provide a modular cartridge of intermediate complexity and is not intended to imply or otherwise limit the present invention to the present cartridge dimension. It is realized that the modularity of the present invention lends to many possible configurations of operable diagnostic cartridges and depending on the field of use and the types and quantity of tests needed and it may be preferable to employ modular assemblages possessing two or more modules as the circumstances dictate.

Figure 7A:
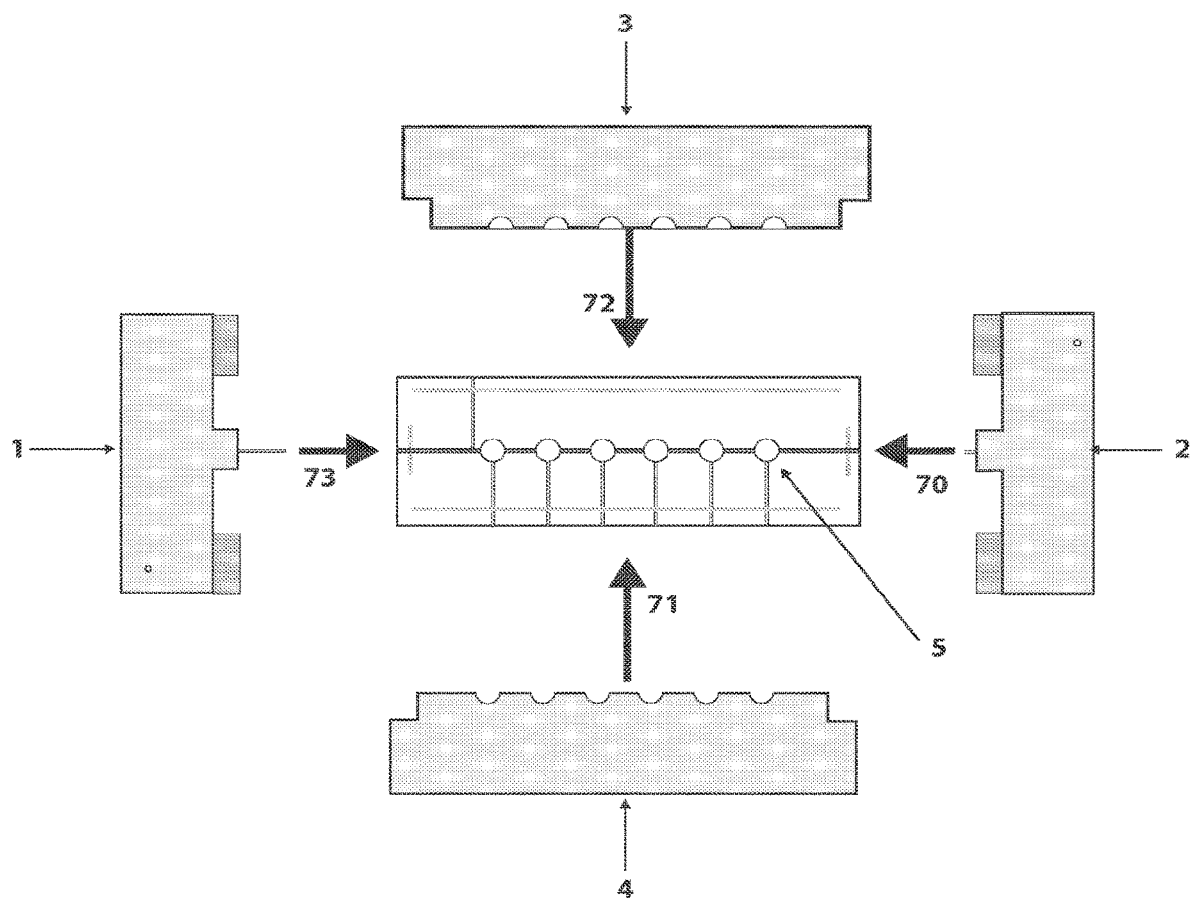
FIG. 7A is the first of a four part composite illustration describing the interconnection and operation of a 5 module assemblage: comprising, modules 1-5, four paths of interconnection generally represented as Arrows 70-73, and port(s) 74 and 75.

FIG. 7A Illustrates the five modules as previously set forth in FIG. 1-5, and the assembly pattern as depicted in FIG. 6. In the present example configuration the assembly of this cartridge would begin with the interconnection of the waste module 2 and the reactor module 5 by path 70, referring to FIG. 6 in this configuration the waste module provides the points of attachment (in the form of slides) needed to receive each reagent module, which would be interconnected to reagent module 4 by path 71, then reagent module 3 by path 72. In this configuration the two reagent modules and the reactor module provide the points of attachment needed to receive the sample module.

Figure 7B:
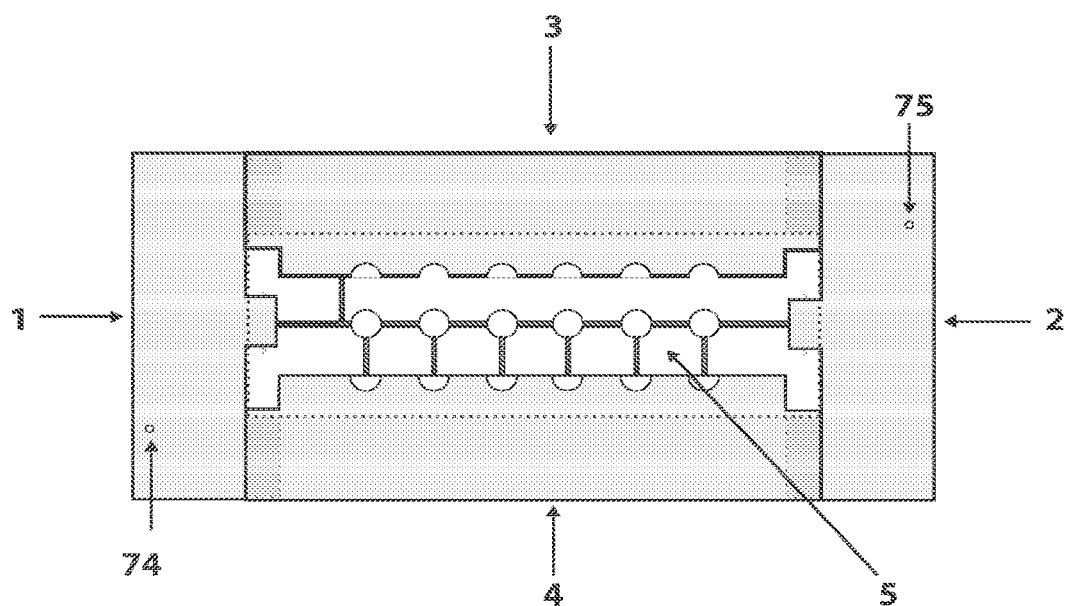
FIG. 7B illustrates modules 1-5 in a resting assembled state.

FIG. 7B shows a top view of the five modules in an assembled state and emphasizes the two ports located on the sample module 74 and waste module 75 for use in, among other things, establishing a pressure gradient across the reactor module. Such a pressure gradient could be used as a first mechanism-of-operation to induce the movement of a sample resident within the sample module into and through the reactor modules by adding a gas or liquid through port 74 while simultaneous subtracting a gas or liquid from port 75.

Figure 7C:
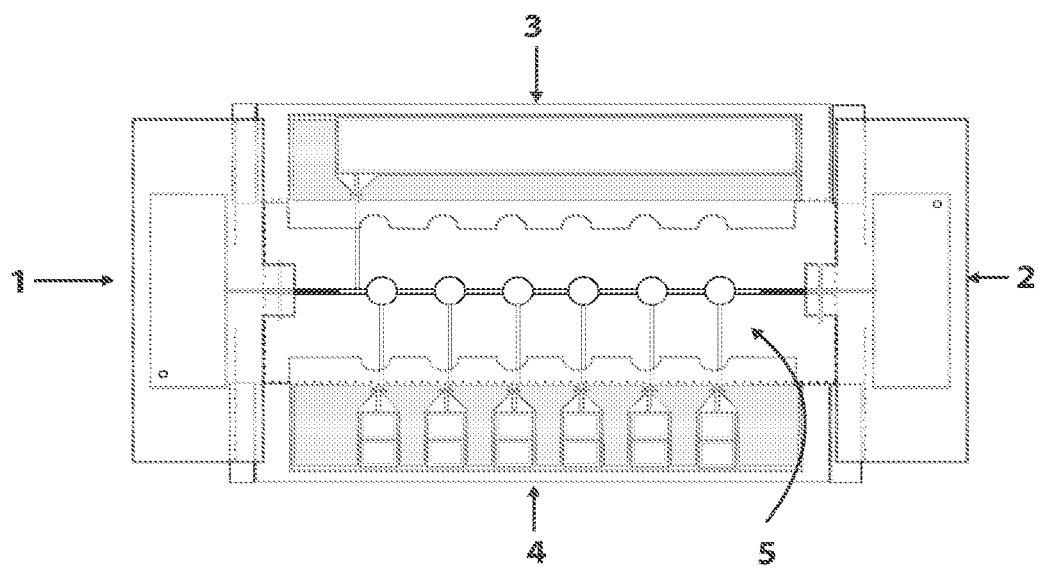
FIG. 7C is a transparent view of modules 1-5 as depicted in FIG. 7B illustrating the hypothetical orientation and configuration of various internal structures within such a module.

FIG. 7C is a transparency view of the inner structures of each module and intended to illustrate how the fluid control pathways of each possible module would operably interrelate to form a closed continuous-flow fluid control network specific for one or more select analytical task.

Figure 7D:
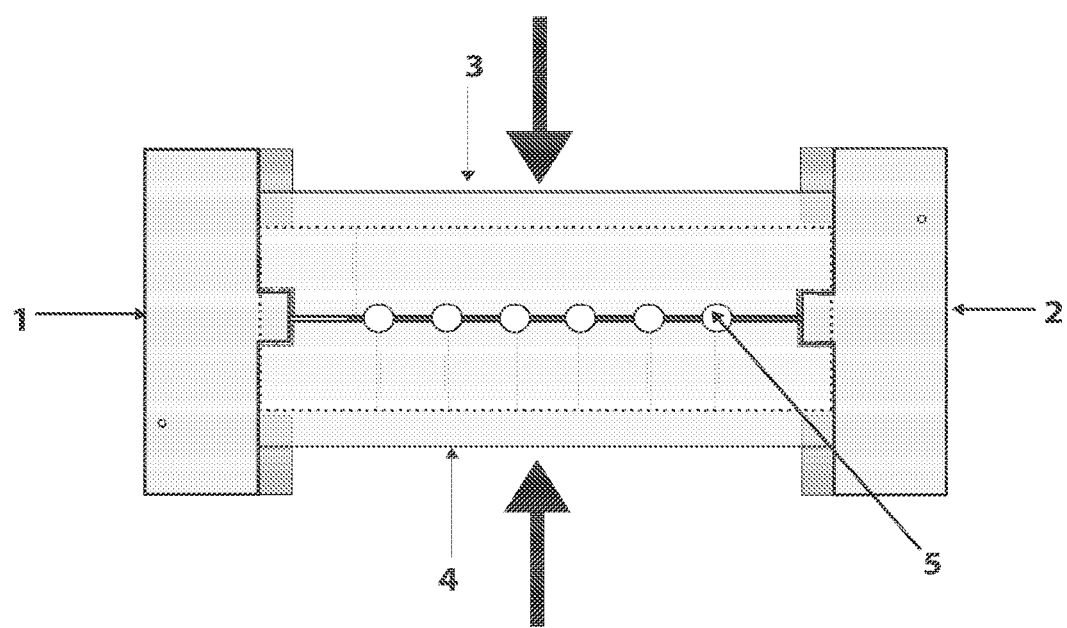
FIG. 7D is the final part of FIG. 7: comprising arrows 76 and 77 that illustrate how modules 3 and 4 could be made to move inward relative to module 5 (dotted line). This movement would result in the compression of any materials located with modules 3 and 4.

FIG. 7D illustrates how modules 3 and 4 could be made to move inward relative to module 5 along the slides/slide guides provided by modules 1, 2, 3, 4, and 5. This motion could provide a second mechanism-of-operation by compress a content held within a slot present within module 3 or 4 as described in FIG. 3 and generally evident by the motion as illustrated inferring the encapsulation of module 5 (dotted lines) by module 3 and 4. In this example, the inward motion of modules 3 and 4 would completely obstruct the mixing chambers of module 5 if it were not for the windows provided by both module 3 and 4 (semi-circular cut outs). The use of such windows would be favorable in acquiring information pertaining to an analytical reaction where an unobstructed view into each mixing chamber was beneficial.

Figure 8:
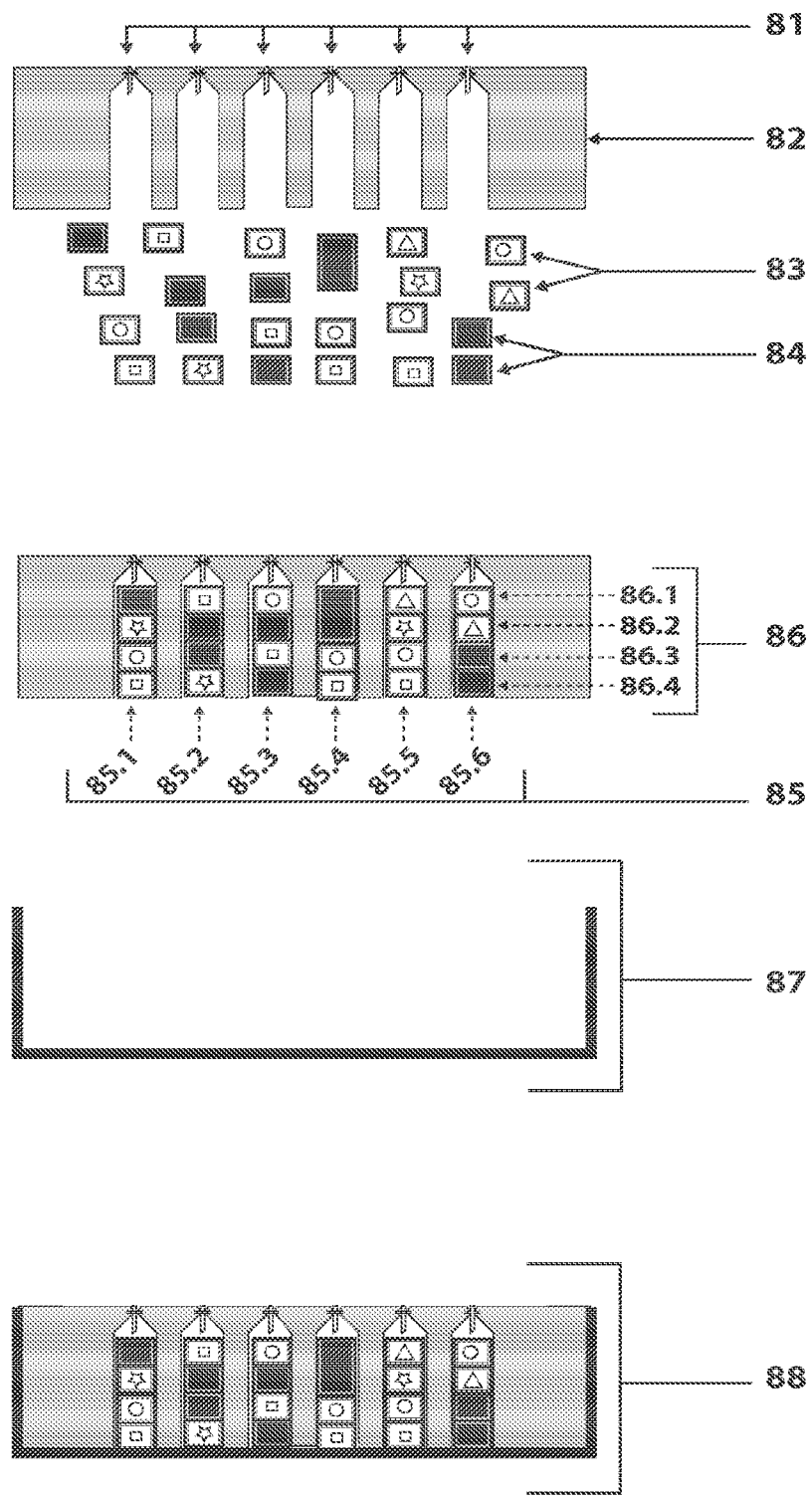
FIG. 8 provides for a possible reagent module illustrated but not described in FIG. 7C. Said module comprises: a series of cannula 81, and compression form 82, wet cells 83 containing a geometric shape indicating the presence of dispensable content, dry cells 84 black boxes indicating the absence of a dispensable content, various serialized reagent clusters 85 oriented to perform six analytical protocols 85.1-85.6 and temporally synchronized 86 into four stage(s) of actuation 86.1-86.4, a module housing 87 indicated as as open box for purposes of clarity and the operable assembly of the various elements into a reagent module 88.

FIG. 8 Illustrates a possible configuration of a module and a corresponding reagent assemblage. For illustrative purposes only, said module is depicted to comprise six cannule 81 operably positioned above a six compartment compression form 82 and a plurality of individualized cells having a select internal volume. Said cells composed of dry cells 85 (black boxes lacking a dispensable content) and wet cells 86 (white boxes containing a geometric shape symbolizing a dispensable content). Said cells are then arranged in series corresponding to six hypothetical analytical protocols 85.1, 85.2, 85.3, 85.4, 85.5, 85.6. Each cell series is then inserted into the compression form wherein the cell corresponding to the first stage of each protocol is oriented closest to the cannula. Doing so orients each cells series into temporally synchronized stages 86.1, 86.2, 86.3, 86.4. The reagent assemblage comprising the cannula 81, compression form 82, and serial arrangements of reagents 85 is then inserted into a module 87 possessing an operable slot for receiving said assemblage (depicted as a boxed line for simplicity) to form an assembled reagent module 88. Again any number of analytical procedures could be programmed utilizing this methodology; the examples presented herein illustrate one possible configuration.

Figure 9:
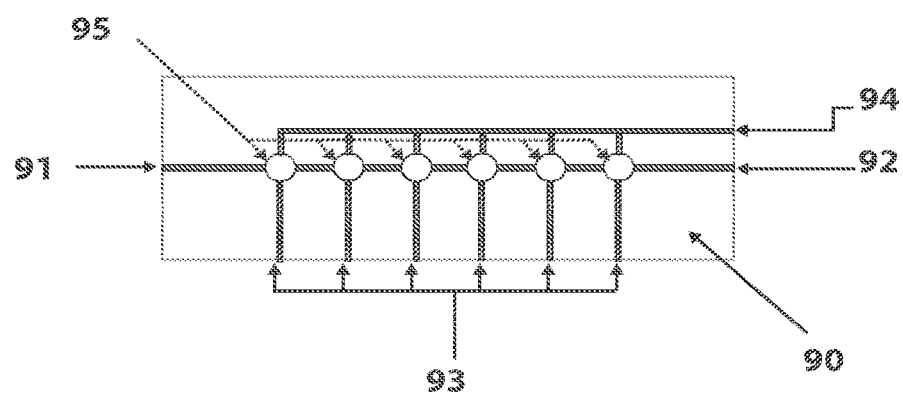
FIG. 9 illustrates a possible reactor module 90 possessing plural paths of fluid communication. A first path of fluid communication originates at inlet 91 extends through a series of mixing chambers 95 and terminates at outlet 92, a second path of fluid communication originates at inlet(s) 93 pass through individual mixing chambers 95 and terminates at outlet 94.

FIG. 9 Illustrates a possible reactor module 90 possessing plural flow paths of fluid communication passing through at a series of mixing chambers 95. For the purposes of this example, a first flow paths originates at inlet 91 passes through each mixing chamber and terminates at outlet 92, the second flow path originates at each individual inlets 93 passes through one mixing chamber and terminates at outlet 94. For simplicity this illustration does not depict the use of a fluid control device with the illustrated fluid control network however such devices (e.g. choke points, valves, gates, diaphragms valves either active and/or passive) may be present within the various types of modules subject to the present invention.

Figure 10:
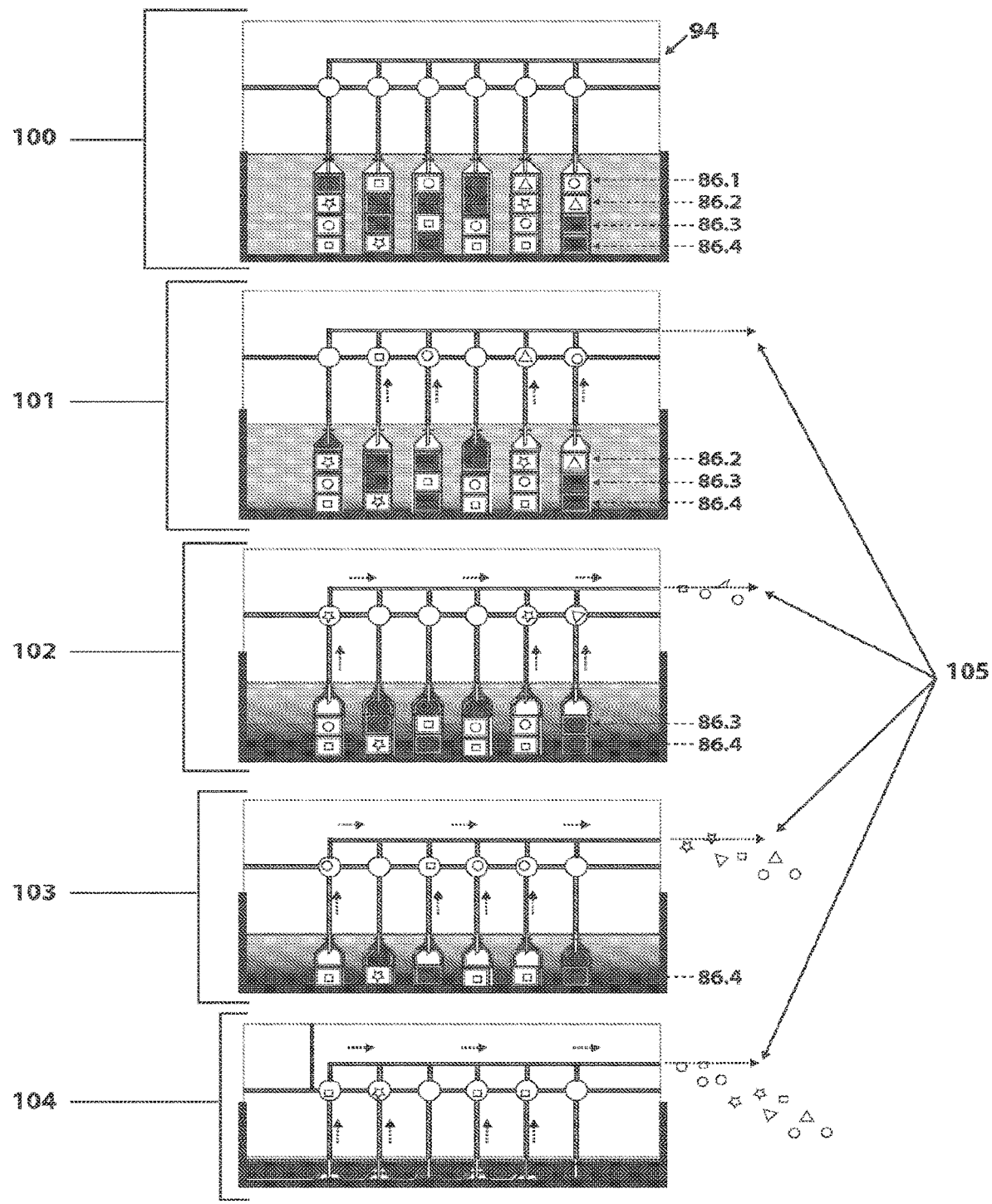
FIG. 10 illustrates how reagent module described in FIG. 8 and the reactor module of FIG. 9 could operate by moving the reagent module inward relative to the reactor module as previously described in FIG. 7D and provided for in item(s) 100-104. Item 100 illustrates the operable interfacing of said reactor and reagent module in a resting state in addition to several identified and unidentified elements previously described in other images. In circumstances where an element is referred to by number but unidentified in the present image please refer to the first number of the numerical identifier associated with an element to locate the figure depicting the specific element; for example, item 81 would be located in FIG. 8, etc. Said elements comprise: cannula 81 and compression form 82 aligned with inlets 93 of the reactor module on one side and serialized reagent cluster(s) 85.1-85.6 on the other side. Note that the reactor module sits inside the reagent module in a movable configuration as provided for by boxed slides 51 of the reactor module and slide guides 34 of the reagent module as previously described. Item 101 illustrates a first incremental advancement of the reagent module relative to the reactor module. This results in the cannula piercing the first temporal sequence of cells 86.1 and the release of any dispensable contents into individual mixing chambers. Item 102-104 illustrates the incremental advancement and sequential release of temporal sequence 86.2-86.4 along with the corresponding discharge 105 of spent material through outlet 94.

FIG. 10 comprises a sequence of illustrations, item(s) 100, 101, 102, 103, 104, to demonstrate how a possible reagent assemblage employing a uniform form of actuation could dispense individual reagents to distinct analytical procedures in a temporally control manner. Item 100 depicts the four temporally synchronized stages 86.1, 86.2, 86.3, 86.4 of the six analytical reactions previously described in FIG. 8 as well as outlet 94 and the fluid control network previously described in FIG. 9. Item 105 signifies the discharge of spent solutions through outlet 94. For the purposes of this example, a pressure gradient across the mixing chambers would be established by compressing the reagent module against the reactor module while lowering the pressure at outlet 94 to decrease the internal pressure of the mixing chamber. As item 101 illustrates, the compression of the reagent module against the reactor module compresses the serialized reagent cluster thereby raising the internal pressure of each cell and actuates the insertion of a cannula into the first cell of each reagent series 86.1. This, in conjunction with lowered pressure at outlet 94, would promote the flow of any dispensable content held within the cells to flow down the pressure gradient through the cannula and into the mixing chambers. Reading left to right across the mixing chambers 'xN' signifies individual chambers followed by a hypothetical analytical reagent. Image(s) 101,102, 103, and 104 illustrates the sequential release of each reagent sequence as the reagent module is compressed into the reactor module:

Item 101/86.1: x1=incubation, x2=square, x3=circle, x4=incubation, x5=triangle, x6=circle.

Item 102/86.2: x1=star, x2=incubation, x3=incubation, x4=incubation, x5=star, x6=triangle.

Item 103/86.3: x1=circle, x2=incubation, x3=square, x4=circle, x5=circle, x6=incubation.

Item 104/86.4: x1=square, x2=star, x3=incubation, x4=square, x5=square, x6=incubation.

Note that the administration of each successive reagent provides the requisite positive pressure to displace spent reagent(s) 105 out of the mixing chamber and through port 94 and into a waste module (not shown) but a number of alternatives are also apparent for collecting waste material. For example, the internal structure of the reactor module, separate from the mixing chambers and other fluid control pathways, could be dedicated to storing spent solutions. Likewise, multiple waste modules could be positioned about the perimeter of the reactor module to enable alternate configurations of discharge outlets for different fluid control networks. As previously stated, this example is illustrative only. Any number of reactions, reagent configurations, and fluid control architecture could be employed to perform different analytical procedures as the circumstances dictate. Likewise, the present illustration depicts the pressing of a cannula onto a cell but a similar result could be achieved by pressing the cells onto a cannula as is illustrated in FIG. 11.

Figure 11:
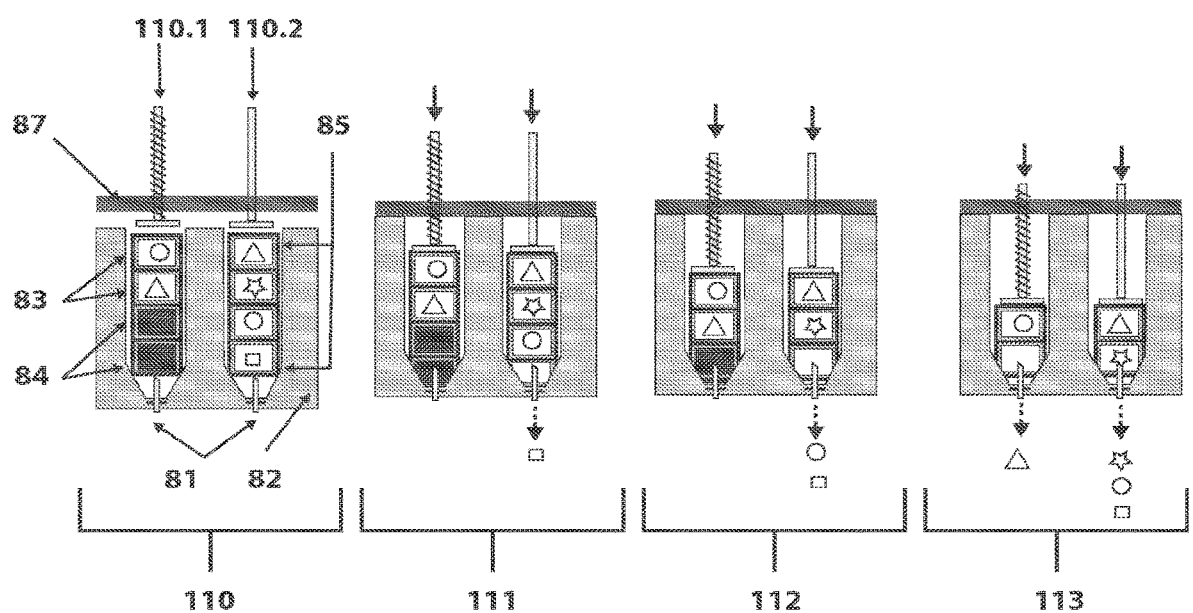
FIG. 11 illustrates and alternative method of accessing the various reagent clusters. Similar to FIG. 10, items 110-113 illustrate how reagent clusters could be pressed onto a cannula 81 by means of a slide plunger 110.1 or screw plunger 110.2.

FIG. 11 is a four part composite illustration of images 110, 111, 112, 113 which illustrates how a threaded screw or plunger could be employed to depress a cell arrangement onto a cannula, which is the inverse motion set forth in FIG. 10. Item 110 depicts a cannula 81, compression form 82, wet cells 83, dry cells 84, reagent module 87, and cell series as previously described in FIG. 8 with the addition of a plunger 110.1, threaded screw 110.2 or other similar type of linear actuator such as a human finger (not shown). Item 111 demonstrates how operable force or twisting motion if applied to the plunger 110.1 or threaded screw 110.2 would result in pressing the cell series through the compression form and onto a cannula. Items 112 and 113 depict how multiple reagents could be controlled by the same motion. The use of such a configuration may be advantageous in providing additional flexibility in performing one or more test protocols. Likewise, the use of serialized reagents in the programmable reagent delivery system as previously set forth may be employed in a more simplified fluidically controlled analytical system.

Figure 12A:
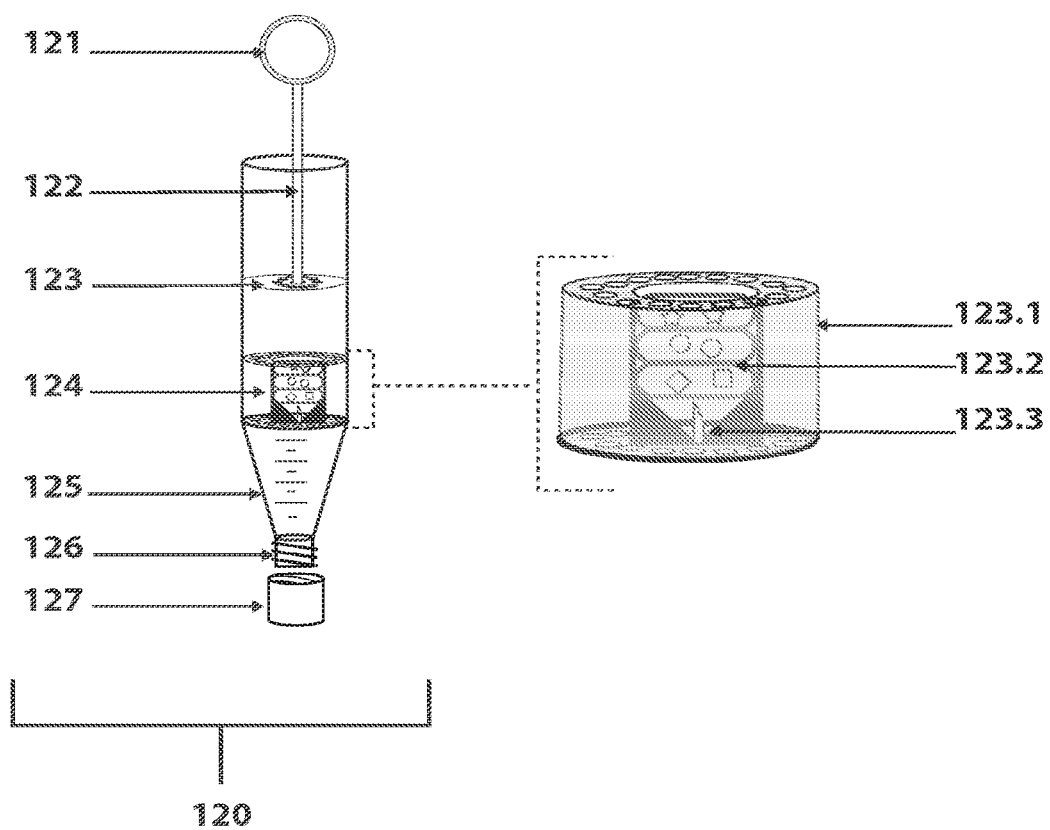
FIG. 12A Illustrates another possible modular assemblage 120; comprising, a plunger depressor 121, plunger shaft 122, bi-directional plunger with a vented flexible diaphragm 123, a reagent module 124 a dual function sample/reactor module 125, a threaded male connector 126, and a cap 127. Said reagent module further comprising a vented reagent module housing 124.1, a serialized reagent cluster 124.2, and cannula and reagent housing 124.3.

FIG. 12A illustrates a possible two-module analytical cartridge 120 possessing a simplified fluidic control system. It comprises a plunger depressor 121, plunger shaft 122, bi-direction plunger with vented flexible diaphragm 123, a reagent module 124, a dual function sample/reactor module with graduations for measuring sample volume 125, a threaded male connector 126, and a threaded cap 127. The reagent module is vented and designed to be inserted into the analytical cartridge, while positioning a reagent cell series within a compression form having a cannula, as set forth in previous figures. This configuration could be used to perform a single test on a liquid sample derived from a number of sources.

Figure 13A:
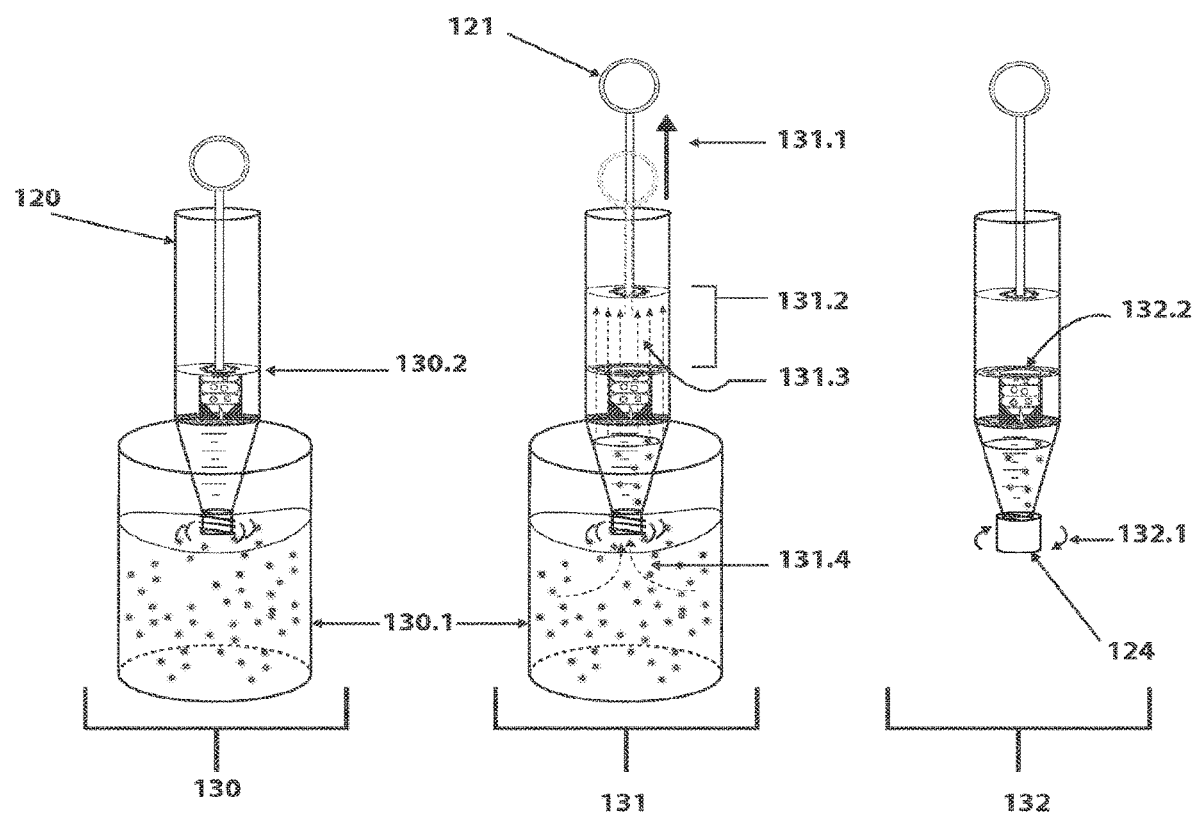
FIG. 13A illustrates select aspects pertaining to the operation of the embodiment described in FIG. 12A. Item 130 depicts a device 120, a sample source 130.1, and a plunger apparatus in a closed state. Item 131 illustrates the upward pulling motion 131.1 of a plunger depressor 121, an expansion between the plunger system and the reagent module 131.2, the formation of a vacuum 131.3, and the movement of a sample 131.4 into the dual function sample/reactor module. Item 132 illustrates the application 132.2 a cap 124 to the device and points out that in this configuration the opening 132.2 of the reagent module is visible.

FIG. 13A illustrates how the device 120 described in FIG. 12 might operate to collect a sample. Item 130 illustrates how the device with the bi-directional plunger in a operably depressed position 130.2 might interface with a liquid sample 130.1. Item 131 illustrates how pulling upward 131.1 on the plunger 121 will retract the vented diaphragm of the bi-direction plunger 131.2 resulting in a vacuum 131.3 that would induce the movement of the sample into the dual function sample/reactor module 131.4. Item 132 illustrates how a screw cap 124 could be secured 123.1 to the device once an adequate sample has been collected. Additionally, the illustration emphasizes that the lifting of the plunger reveals the opening of the reagent module 132.2.

Figure 13B:
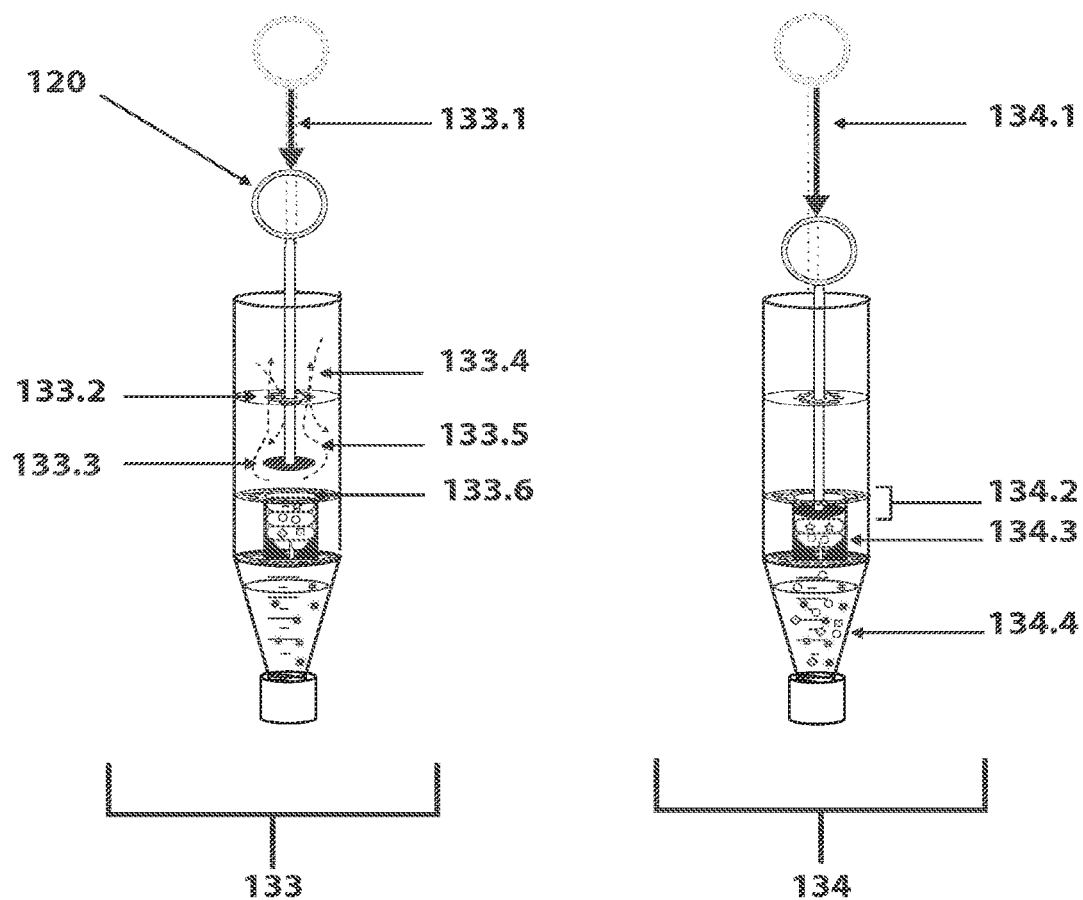
FIG. 13B illustrates additional aspects pertaining to the operation of the device described in FIG. 13A. Item 133 depicts the depression 133.1 of the plunger depressor 120, the separation of the dual function plunger system into a stationary vented diaphragm 133.2 and a plunger 133.3 and the opening to the reagent module 132.2. Item 134 illustrates that the continued advancement of the plunger system 134.1 presses the plunger against the reagent cluster 134.2 against the cannula provided within the reagent module 134.3 which sequentially dispenses the contents of the cell into the dual function sample/reactor module 134.4.

FIG. 13B illustrates how the device 120 could be operated to perform a test on a sample. Item 133 illustrates how the depression 133.1 of the bi-directional plunger would separate the vented flexible diaphragm 133.2 from the plunger 133.3 leaving the diaphragm in a stationary position pressed against the internal wall of the device. The vents illustrated on the flexible diaphragm 133.2 provide for the equalization of atmosphere between the upper 133.4 and lower 133.5 compartments formed by the diagram as the plunger 133.3 interfaces with the reagent cell series seated into the opening of the reagent compartment 133.6. Item 134 illustrates how further depressing the plunger 134.1 would result in the plunger entering into the reagent module and sequentially compress each reagent cell 134.3 onto a cannula releasing the contents into the mixing compartment 134.4. Again the present illustration is not intended to be limiting a wide range of modular configurations and configurations of reagent cells are envisioned having unique advantages to different test protocols. The utility of a non-vented diaphragm in sealing contents within the device is realized for applications where it would be preferable to prevent spillage of contents from the device.

Figure 14:
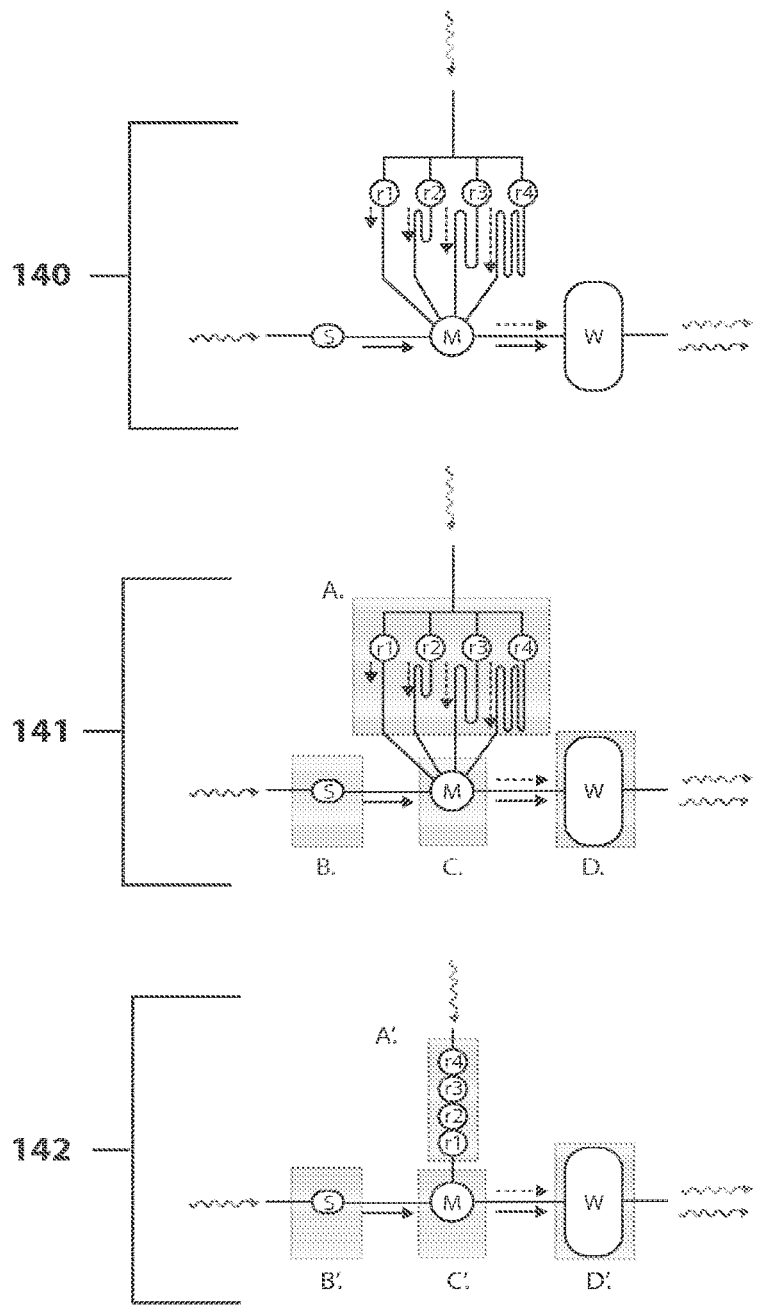
FIG. 14 Provides for a method of dividing a hypothetical fluid control network into functional divisions operable to be manufactured as individual modules. Item 140 provides for a hypothetical closed continuous-flow fluid control network operable to perform an analytical task consisting of a sample S reservoir, a mixing chamber M, a waste container W, and four reservoirs for storing analytical reagents r1, r2, r3, r4; as well as, a first path of fluid communication solid arrows and a second path of fluid communication dotted arrows. The illustration of solid or dotted wavy arrows pointing at said network communicates the placement of means that push fluids through the present network (such as high pressure), whereas, the illustration of solid or dotted wavy arrows pointing away from the network communicates the placement of means that pull fluids through the present network (such a low pressure). Item 141 illustrates four possible functional divisions of the present network A, B, C, D. Item 142 illustrates how the present network could be further functionally reduced and provides four possible functional divisions A', B', C', D'.

FIG. 14 illustrates how to create a continuous-flow modular diagnostic cartridge. Item 140 illustrates a possible closed fluid control network enable to perform an analytical task involving a sample reservoir S, four distinct analytical reagent containers r1, r2, r3, r4 having a defined temporal sequence of administration defined by flow path dotted arrows. Each reagent must travel to reach a mixing chamber M, and a waste reservoir W. Item 141 illustrates an aspect of the present invention pertaining to how a fluid control network could be divided into functional groupings A, B, C, D that could be manufactured as individual modules. Item 142 illustrates another aspect of the present invention pertaining to how the same fluid control network could be reconfigured and divided into functional grouping that are functionally reduced A', B', C', D'.

The present illustrations are representative only and provide only a few possible contexts in which the present invention could be employed are not intended to limit the scope of all possible applications for the present invention in anyway.

I claim:
1. A microfluidic module comprising:
(a) a substrate having one or more sides;
(b) at least one fluid control structure configured to store, dispense, or retain an analytical reagent, sample, waste solution, or mixtures thereof;
(c) a fluid control pathway passing through the fluid control structure interconnecting the fluid control structure to one or more openings on one or more sides of the substrate;
(d) a modular interface comprising a slidable element of a movable mechanical connection, wherein the slidable element:

(i) includes at least one of the group consisting of a slide and a slide-guide, and
(ii) is configured to engage with a cooperating slidable element on a corresponding module to thereby perfect a movable mechanical connection that enables relative motion between the module and the corresponding module along a constrained linear guide path, wherein the constrained linear guide path maintains alignment of the module and the corresponding module such that relative motion along the constrained linear guide path actuates transfer of fluid between the module and the corresponding module.

2. The module of claim 1 further comprising a slot formed in the substrate, wherein the slot is configured to house a wet-cell such that the wet-cell is aligned with a first fluid control pathway of the corresponding module, thereby enabling transfer of fluid from the wet-cell to the first fluid control pathway.

3. The module of claim 2 wherein the slot is further configured to receive the corresponding module.

4. The module of claim 1 further comprising a single path of fluid communication through one or more fluid control structures.

5. The module of claim 1 further comprising plural paths of fluid communication through a plurality of fluid control structures wherein the plurality of fluid control structures are arrangeable in series, in parallel, or in a parallel series.

6. The module of claim 1 further comprising an analytical material enclosed within the fluid control structure.

7. The module of claim 1 further comprising a fluid control structure enabled to be set under negative pressure.

8. The module of claim 1 further comprising:
(a) a slot; and
(b) a cell disposed within the slot, wherein the cell is at least one of the group consisting of a wet-cell comprising a packaged liquid reagent and a dry-cell comprising a compressible spacer element calibrated to effect the timing of transfer of fluid and wherein the cell is at least a portion of the fluid control structure.

9. The module of claim 8 further comprising a linear actuator comprising a first end and a second end, wherein the first end is connected to the cell.

10. The module of claim 8 further comprising a piercing device disposed within the slot.

11. The module of claim 8 wherein multiple cells are arranged as a first linear series within the slot, wherein the first linear series corresponds to a temporal sequence transfer of fluid.

12. The module of claim 11 further comprising multiple cells arranged as a second linear series within a second slot, wherein the second linear series is in parallel with the first linear series, and wherein the first linear series corresponds to a temporal sequence transfer of fluid.

13. The module of claim 8 further comprising a compression form disposed within the slot.

* * * * *